US006952929B2

(12) United States Patent
Inoue et al.

(10) Patent No.: US 6,952,929 B2
(45) Date of Patent: Oct. 11, 2005

(54) AIR CONDITIONING SYSTEMS FOR VEHICLES, COMPRISING SUCH AIR CONDITIONING SYSTEMS, AND METHODS FOR DRIVING HYBRID COMPRESSORS OF SUCH AIR CONDITIONING SYSTEMS

(75) Inventors: Atsuo Inoue, Isesaki (JP); Masato Tsuboi, Isesaki (JP); Hiromitsu Adachi, Wako (JP); Masamichi Kubota, Wako (JP); Hiroshi Ikura, Wako (JP); Hideki Watanabe, Wako (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 10/934,695

(22) Filed: Sep. 7, 2004

(65) Prior Publication Data

US 2005/0022546 A1 Feb. 3, 2005

Related U.S. Application Data

(63) Continuation of application No. 10/465,579, filed on Jun. 20, 2003, now Pat. No. 6,786,055.

(30) Foreign Application Priority Data

Jun. 27, 2002 (JP) ........................................ 2002-187885

(51) Int. Cl.[7] ................................................. F25B 1/00
(52) U.S. Cl. ............................. 62/115; 62/133; 62/230; 62/236; 417/16; 417/212
(58) Field of Search ............................. 62/115, 133, 236, 62/323.3, 239, 244, 228.4, 230; 417/16, 364, 374, 212

(56) References Cited

U.S. PATENT DOCUMENTS

| 2,677,251 | A | 5/1954 | Clark |
|---|---|---|---|
| 4,277,955 | A | 7/1981 | Parker |
| 4,411,141 | A | 10/1983 | Hara |
| 4,591,318 | A | 5/1986 | Elson |
| 4,609,329 | A | 9/1986 | Pillis et al. |
| 4,729,717 | A | 3/1988 | Gupta |
| 4,990,071 | A | 2/1991 | Sugimoto |

(Continued)

FOREIGN PATENT DOCUMENTS

| DE | 19513710 | | 10/1995 |
|---|---|---|---|
| EP | 0 204190 A1 | * | 12/1986 |
| EP | 1213166 | | 6/2002 |
| EP | 1284366 | | 2/2003 |
| JP | 358107092 A | * | 6/1983 |
| JP | 687678 | | 12/1984 |
| JP | 60153885 | | 10/1985 |
| JP | 02119689 | | 5/1990 |
| JP | 05071486 | | 3/1993 |
| JP | 06087678 | | 12/1994 |
| JP | 2000 110734 | | 4/2000 |

Primary Examiner—Mohammad M. Ali
(74) Attorney, Agent, or Firm—Baker Botts L.L.P.

(57) ABSTRACT

An air conditioning system for a vehicle includes a compressor. The vehicle includes a first drive source and the compressor includes a second drive source. The compressor is driven by the first drive source or the second drive source, or a combination thereof, and the second drive source includes an electrical power supply. The air conditioning system also includes a controller for selecting between the first drive source and the second drive source, such that when the compressor is active, the first drive source drives the compressor except when the vehicle is operating in a predetermined mode, a voltage of the electrical power supply is greater than or equal to a minimum electrical power supply voltage, and an amount of electric power consumed by the second drive source is less than a maximum electric power. For example, the predetermined mode may be an idle-stop mode.

29 Claims, 2 Drawing Sheets

U.S. PATENT DOCUMENTS

| | | | |
|---|---|---|---|
| 5,050,701 A * | 9/1991 | Okui et al. ................. 180/297 |
| 5,236,311 A | 8/1993 | Lindstrom |
| 5,295,808 A | 3/1994 | Machida et al. |
| 5,305,613 A * | 4/1994 | Hotta et al. .................... 62/209 |
| 5,385,453 A | 1/1995 | Fogt et al. |
| 5,428,966 A | 7/1995 | Alsenz |
| 5,435,144 A | 7/1995 | Kalmbach |
| 5,556,269 A | 9/1996 | Suzuki et al. |
| 5,558,508 A | 9/1996 | Sasano et al. |
| 5,704,323 A * | 1/1998 | Gardell et al. ........... 123/179.3 |
| 5,755,463 A | 5/1998 | Machida et al. |
| 5,755,564 A | 5/1998 | Machida et al. |
| 5,839,886 A | 11/1998 | Shaw |
| 5,867,996 A | 2/1999 | Takano et al. |
| 5,983,656 A | 11/1999 | Tokumasu |
| 6,002,218 A * | 12/1999 | Toda et al. .................... 318/66 |
| 6,109,045 A | 8/2000 | Takenaka |
| 6,192,155 B1 | 2/2001 | Fan |
| 6,209,700 B1 * | 4/2001 | Wogaman et al. ..... 192/84.961 |
| 6,217,297 B1 | 4/2001 | Tsumagari et al. |
| 6,230,507 B1 | 5/2001 | Ban et al. |
| 6,234,769 B1 | 5/2001 | Sakai et al. |
| 6,287,081 B1 | 9/2001 | Tamegai et al. |
| 6,287,083 B1 | 9/2001 | Hase et al. |
| 6,334,755 B1 | 1/2002 | Coudray et al. |
| 6,351,957 B2 * | 3/2002 | Hara ........................... 62/133 |
| 6,375,436 B1 | 4/2002 | Irie et al. |
| 6,540,489 B1 | 4/2003 | Higashiyama |
| 6,543,243 B2 | 4/2003 | Mohrmann et al. |
| 6,554,088 B2 * | 4/2003 | Severinsky et al. ........ 180/65.2 |
| 6,619,926 B2 * | 9/2003 | Manole et al. ................ 417/53 |
| 6,675,596 B2 * | 1/2004 | Iwanami et al. .............. 62/236 |
| 2001/0047659 A1 | 12/2001 | Nakamura et al. |
| 2001/0049943 A1 | 12/2001 | Nakamura et al. |
| 2003/0047659 A1 | 3/2003 | Evang |
| 2003/0049943 A1 | 3/2003 | Chai et al. |
| 2003/0053916 A1 | 3/2003 | Terauchi |
| 2003/0136138 A1 | 7/2003 | Tsuboi et al. |
| 2003/0152467 A1 | 8/2003 | Higashiyama et al. |
| 2003/0167784 A1 | 9/2003 | Higashiyama |

* cited by examiner

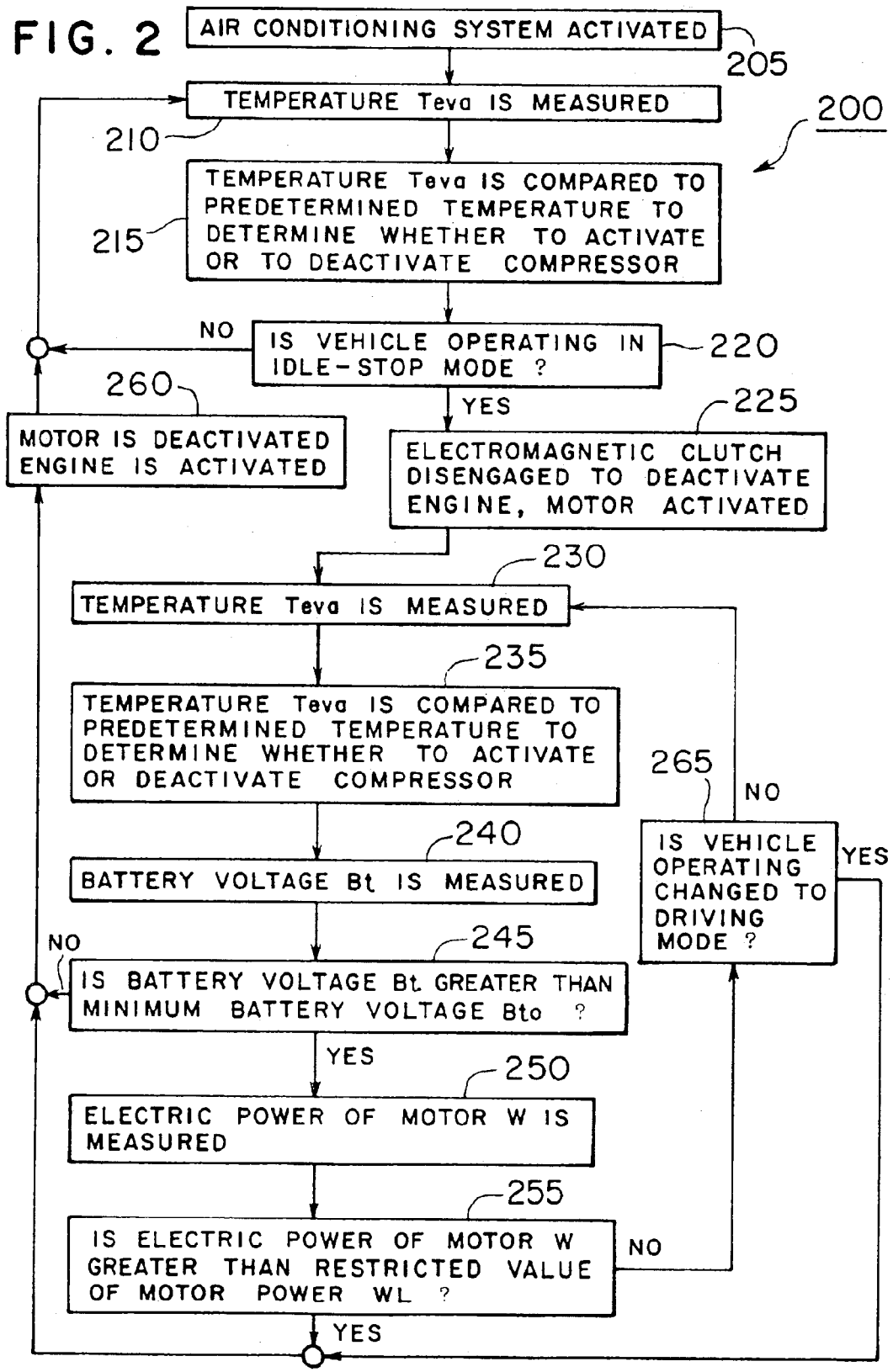

AIR CONDITIONING SYSTEMS FOR VEHICLES, COMPRISING SUCH AIR CONDITIONING SYSTEMS, AND METHODS FOR DRIVING HYBRID COMPRESSORS OF SUCH AIR CONDITIONING SYSTEMS

This application is a continuation of U.S. patent application Ser. No. 10/465,579, filed Jun. 20, 2003, now U.S. Pat. No. 6,786,055, which is incorporated herein by reference in its entirety.

BACKGROUND OF THE INVENTION

1. Field of the Invention

The present invention relates generally to air conditioning systems for use in vehicles, vehicles comprising such air conditioning systems, methods for driving a hybrid compressor of such air conditioning systems. In particular, the present invention is directed towards vehicles, air conditioning systems, and methods for driving a hybrid compressor, in which a drive source of the hybrid compressor switches from an electric drive motor of the hybrid compressor to an engine of the vehicle, when predetermined conditions are satisfied.

2. Description of Related Art

Known hybrid vehicles include a first drive source, e.g., an engine, and an air conditioning system. Such known air conditioning systems, such as the air conditioning system described in U.S. Pat. No. 5,867,996, include a hybrid compressor, and the hybrid compressor includes a second drive source, e.g., an electric motor, and an electrical power supply, e.g., a battery, for the second drive source. The hybrid compressor may be driven by the first drive source or the second drive source, or both. Specifically, the first drive source drives the hybrid compressor when the first drive source is engaged, and the second, drive source drives the hybrid compressor when the first drive source is disengaged. As such, whether the first drive source or the second drive source drives the hybrid compressor depends on whether the first drive source is engaged or disengaged. Nevertheless, when the voltage of the electrical power supply is less than a predetermined voltage, or when the amount of power consumed by the second drive source is greater than a predetermined amount of power, the ability of the air conditioning system to deliver sufficiently cooled air or sufficiently heated air to an interior of the vehicle is reduced. Moreover, the driving force of the second drive source may be insufficient to drive other components of the air conditioning system, e.g., a blower.

SUMMARY OF THE INVENTION

Therefore, a need has arisen for air conditioning systems which overcome these and other shortcomings of the related art. A technical advantage of the present invention is that when predetermined conditions related to the voltage of the electrical power supply or the amount of power consumed by the second drive source, or both, are satisfied, the drive source of the compressor switches from the second drive source to the first drive source.

According to an embodiment of the present invention, an air conditioning system for a vehicle comprises at least one compressor. The vehicle comprises a first drive source, and the at least one compressor comprises a second drive source. The at least one compressor is driven by the first drive source or the second drive source, or a combination thereof, and the second drive source comprises an electrical power supply. The air conditioning system also comprises means for selecting between the first drive source and the second drive source, e.g., a controller, such that when the at least one compressor is active, at least the first drive source drives the at least one compressor except when the vehicle is operating in at least one predetermined mode, a voltage of the electrical power supply is greater than or equal to a minimum electrical power supply voltage, and an amount of electric power consumed by the second drive source is less than a maximum electric power. For example, the at least one predetermined mode may be an idle-stop mode.

According to another embodiment of the present invention, an air conditioning system for a vehicle comprises at least one compressor. The vehicle comprises a first drive source, and the at least one compressor comprises a second drive source. The at least one compressor is driven by the first drive source or the second drive source, or a combination thereof, and the second drive source comprises an electrical power supply. The air conditioning system also comprises means for selecting between the first drive source and the second drive source, e.g., a controller, such that when the at least one compressor is active, at least the first drive source drives the at least one compressor except when the vehicle is operating in at least one predetermined mode, an amount of electrical power delivered by the electrical power supply to the second drive source is greater than or equal to a minimum electrical power, and an amount of electric power consumed by the second drive source is less than a maximum electric power. For example, the at least one predetermined mode may be an idle-stop mode.

According to yet another embodiment of the present invention, an air conditioning system for a vehicle comprises at least one compressor. The vehicle comprises a first drive source, and the at least one compressor comprises a second drive source. The at least one compressor is driven by the first drive source or the second drive source, or a combination thereof, and the second drive source comprises an electrical power supply. The air conditioning system also comprises means for selecting between the first drive source and the second drive source, e.g., a controller. Moreover, the means for selecting is adapted to select at least the first drive source at least when the at least one compressor is active and an amount of electric power consumed by the second drive source is greater than or equal to a maximum electric power. In another embodiment of the present invention, the means for selecting also is adapted to select at least the first drive source at least when a voltage of the electrical power supply is less than a minimum electrical power supply voltage, or when an amount of electrical power delivered by the electrical power supply to the second drive source is less than a minimum electrical power, or both.

According to still another embodiment of the present invention, a vehicle comprises a first drive source and an air conditioning system. The air conditioning system comprises at least one compressor comprising a second drive source. The at least one compressor is driven by the first drive source or the second drive source, or a combination thereof, and the second drive source comprises an electrical power supply. The air conditioning system also comprises means for selecting between the first drive source and the second drive source, e.g., a controller, such that when the at least one compressor is active, at least the first drive source drives the at least one compressor except when the vehicle is operating in at least one predetermined mode, a voltage of the electrical power supply is greater than or equal to a minimum electrical power supply voltage, and an amount of electric power consumed by the second drive source is less than a maximum electric power. For example, the at least one predetermined mode may be an idle-stop mode.

According to still yet another embodiment of the present invention, a vehicle comprises a first drive source and an air conditioning system. The air conditioning system comprises at least one compressor comprising a second drive source. The at least one compressor is driven by the first drive source or the second drive source, or a combination thereof, and the second drive source comprises an electrical power supply. The air conditioning system also comprises means for selecting between the first drive source and the second drive source, e.g., a controller, such that when the at least one compressor is active, at least the first drive source drives the at least one compressor except when the vehicle is operating in at least one predetermined mode, an amount of electrical power delivered by the electrical power supply to the second drive source is greater than or equal to a minimum electrical power, and an amount of electric power consumed by the second drive source is less than a maximum electric power. For example, the at least one predetermined mode may be an idle-stop mode.

According to a further embodiment of the present invention, a vehicle comprises a first drive source and an air conditioning system. The air conditioning system comprises at least one compressor comprising a second drive source. The at least one compressor is driven by the first drive source or the second drive source, or a combination thereof and the second drive source comprises an electrical power supply. The air conditioning system also comprises means for selecting between the first drive source and the second drive source, e.g., a controller. Moreover, the means for selecting is adapted to select at least the first drive source at least when the at least one compressor is active and an amount of electric power consumed by the second drive source is greater than or equal to a maximum electric power. In another embodiment of the present invention, the means for selecting also is adapted to select at least the first drive source at least when a voltage of the electrical power supply is less than a minimum electrical power supply voltage, or when an amount of electrical power delivered by the electrical power supply to the second drive source is less than a minimum electrical power, or both.

According to a still a further embodiment of the present invention, a method for driving at least one compressor of an air conditioning system of a vehicle is provided. The vehicle comprises a first drive source, and the air conditioning system comprises the at least one compressor. The at least one compressor comprises a second drive source, and the second drive source comprises an electrical power supply. Moreover, the at least one compressor is driven by the first drive source or the second drive source, or a combination thereof. The method comprises the steps of determining whether the vehicle is operating in at least one predetermined mode, e.g., an idle-stop mode, and activating the second drive source when the vehicle is operating in the at least one predetermined mode. The method also comprises the steps of determining whether an amount of electric power consumed by the second drive source is greater than or equal to a maximum electric power, and switching the drive of the at least one compressor from the second drive source to the first drive source when the amount of electric power consumed by the second drive source is greater than or equal to the maximum electric power.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

FIG. 2 is a flow chart depicting an operation of the air conditioning system of FIG. 1 according to an embodiment of the present invention.

DETAILED DESCRIPTION OF PREFERRED EMBODIMENTS

Figure 1:
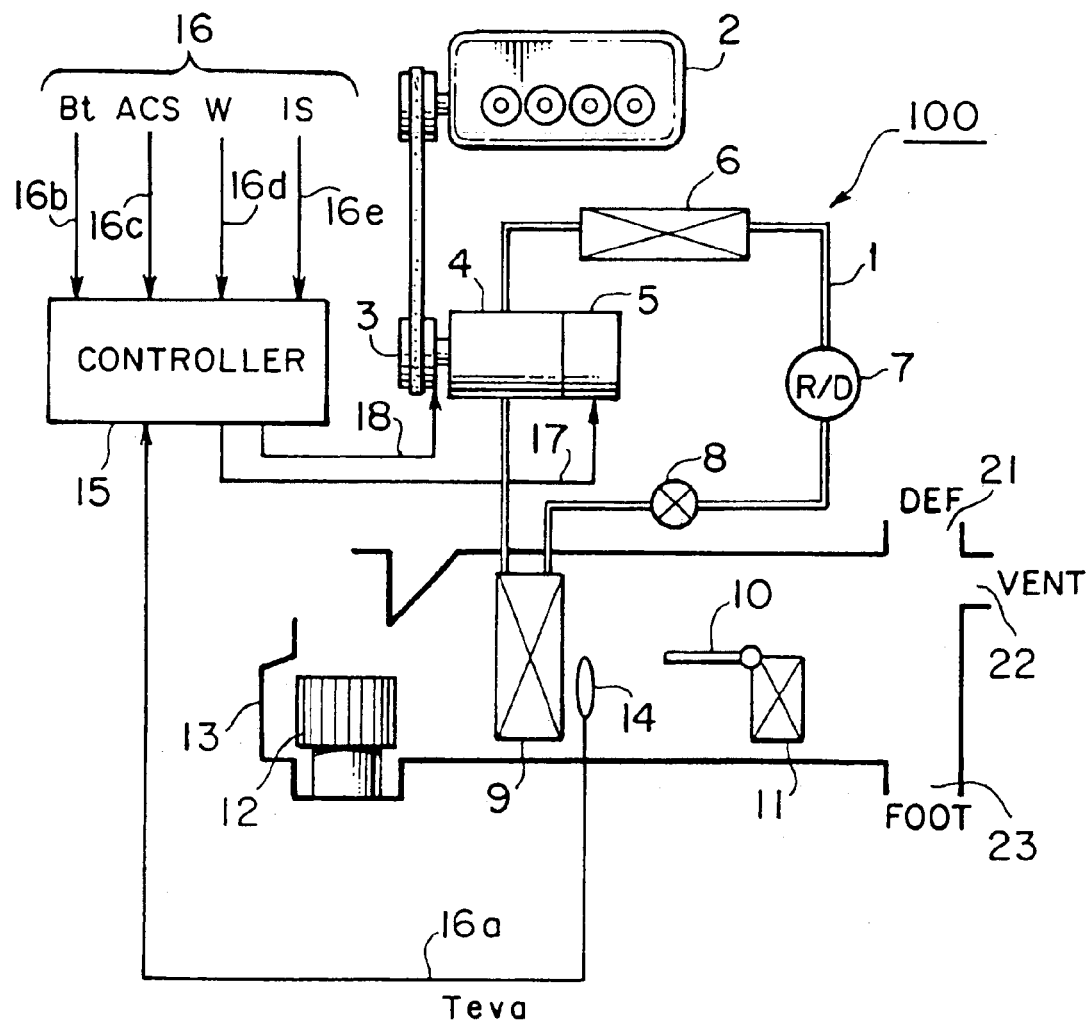
FIG. 1 is a schematic diagram of an air conditioning system according to an embodiment of the present invention.

Preferred embodiments of the present invention and their features and advantages may be understood by referring to FIGS. 1 and 2, like numerals being used for like corresponding parts in the various drawings.

Referring to FIG. 1, an air conditioning system 100 for a vehicle (not shown) according to an embodiment of the present invention is depicted. Air conditioning system 100 may comprise a hybrid compressor 4 and a refrigeration circuit 1. Hybrid compressor 4 may be a variable displacement type compressor, a swash plate type compressor, a rotary type compressor, a scroll type compressor, or the like. In an embodiment, the vehicle may comprise a first drive source 2, e.g., an engine, and hybrid compressor 4 may comprise a second drive source 5, e.g., an electric motor. In this embodiment, hybrid compressor 4 may be driven by first drive source 2, second drive source 5, or both. The driving force of drive source 2 may be transmitted to hybrid compressor 4 via an electromagnetic clutch 3 attached to hybrid compressor 4.

In another embodiment, hybrid compressor 4 may be similar to hybrid compressors described in U.S. Pat. Nos. 6,247,899 and 6,375,436. For example, hybrid compressor 4 may comprise, a first compression mechanism (not shown) and a second compression mechanism (not shown). Specifically, first drive source 2 may drive the first compression mechanism, and second drive source 5 may drive the second compression mechanism. Moreover, air conditioning system 100 may comprise means for selecting whether first drive source 2 or second drive source 5, or both, drives hybrid compressor 4. For example, the means for selecting may comprise a controller 15, and first drive source 2 and second drive source 5 may operate selectively or simultaneously in response to electrical, mechanical, or electro-mechanical control signals from controller 15. The vehicle also may comprise electromagnetic clutch 3 for transmitting a rotational force from first drive source 2 to a drive shaft (not shown) of hybrid compressor 4. In this embodiment, the drive shaft may comprise a first portion and a second portion. Specifically, first drive source 2 may drive the first portion of the drive shaft via electromagnetic clutch 3, and second drive source 5 may drive the second portion of the drive shaft in response to the control signals from controller 15.

In another embodiment, hybrid compressor 4 may be similar to the hybrid compressor described in U.S. patent application Ser. No. 10/235,802. For example, hybrid compressors 4 may comprise a first drive shaft and a second drive shaft. Moreover, first drive source 2 may drive the first drive shaft via electromagnetic clutch 3, and second drive source 5 may drive the second drive shaft via controller 15. In another example, air conditioning system 100 may comprise a pair of hybrid compressors 4. Specifically, a first of hybrid compressors 4 may comprise the first drive shaft, and a second of hybrid compressors 4 may comprise the second drive shaft. Moreover, first drive source 2 may drive the first drive shaft via electromagnetic clutch 3, and second drive source 5 may drive the second drive shaft via controller 15.

In any of the above described embodiments of the present invention, refrigeration circuit 1 may comprise a plurality of refrigeration tubes, and a refrigerant may be circulated within refrigeration circuit 1 via the refrigeration tubes. Refrigerant circuit 1 may comprise hybrid compressor 4, a condenser 6; a receiver 7; an, expansion valve 8; and an evaporator 9. Hybrid compressor 4 may be connected operationally to condenser 6, and condenser 6 may be connected operationally to receiver 7. Receiver 7 may be connected operationally to expansion valve 8, and expansion valve 8 may be connected operationally to evaporator 9. Moreover, evaporator 9 may be connected operationally to hybrid compressor 4; such that hybrid compressor 4, condenser 6, receiver 7, expansion valve 8, and evaporator 9 form a closed, refrigeration circuit. In operation, hybrid compressor 4 may receives refrigerant gas from evaporator 9 and also may compress that refrigerant gas. Compressing the refrigerant gas may increase a temperature of the refrigerant gas and also may increase a pressure of the refrigerant gas. Hybrid compressor 4 may pass the compressed refrigerant gas to condenser 6. When the compressed refrigerant gas flows through condenser 6, at least a portion of the refrigerant gas may condense into a liquid refrigerant. Moreover, condenser 6 may pass the condensed refrigerant to receiver 7, and receiver 7 may divide the condensed refrigerant into a liquid refrigerant portion and a refrigerant gas portion. Receiver 7 may pass the liquid refrigerant portion of the refrigerant to expansion valve 8, which may decrease the pressure of the liquid refrigerant. When expansion valve 8 reduces the pressure of the liquid refrigerant, expansion valve 8 may pass the refrigerant to evaporator 9, and mix the refrigerant with air dispensed by blower 12, which may evaporate the liquid refrigerant into a refrigerant gas. The refrigerant gas then may be passed to hybrid compressor 4.

Air conditioning system 100 also may comprise a heater core 11 positioned at a downstream side of evaporator 9, and an air mix damper 10 formed between the downstream side of evaporator 9 and an upstream side of heater core 11. Air mix damper 10 may be driven by a servo motor (not shown). The movement of air mix damper 10 may control a volume of air capable passing through heater core 11 via evaporator 9, which may control the air temperature within the interior of the vehicle. Moreover, blower 12, evaporator 9, air mix damper 10, and heater core 11 may be positioned within an air duct 13. Air conditioning system 100 also may comprise a first discharge port 21, a second discharge port 22, and a third discharge port 23, and discharge ports 21–23 may be positioned at a downstream side of air duct 13. For example, first discharge port 21 may be formed above third discharge port 23, and second discharge port 22 may be formed between first discharge port 21 and third discharge port 23. Moreover, first discharge port 21 may be used during a DEFROST mode, second discharge port 22 may be used in a VENT mode, and third discharge port 23 may be a FOOT mode. Such modes may determine the source from which the air entering the interior of the vehicle is drawn, or the direction in which the entering air blows, or both.

A temperature sensor 14 for measuring a temperature $T_{eva}$ of air dispensed from evaporator 9 may be positioned between evaporator 9 and heater core 11. Temperature sensor 14 also may be operationally connected to controller 15. Specifically, temperature sensor 14 transmits a first signal 16a to controller 15 indicating a value of $T_{eva}$. In an embodiment of the present invention, the vehicle also may comprise an electrical power supply (not shown), e.g., a battery, for second drive source 5, and controller 15 may receive a second signal 16b from the electrical power supply indicating a voltage $B_t$ of the electrical power supply. Controller 15 also may receive a third signal 16c indicating whether air conditioning system 100 currently is operating, and a fourth signal 16d indicating an amount of electric power consumed by second drive source 5. Moreover, controller 15 may receive a fifth signal 16e indicating whether the vehicle is in an idle-stop mode. An idle-stop mode occurs when the vehicle's speed is less than a predetermined speed, e.g., about zero kilometers per hour, during vehicle operation. Based on first signal 16a, second signal 16b, third signal 16c, fourth signal 16d, or fifth signal 16e, or a combination thereof, controller 15 may generate a first control signal 17 for controlling a rotational speed of second drive source 5, and a second control signal 18 for controlling the engagement and disengagement of electromagnetic clutch 3.

Specifically, when second drive source 5 drives compressor 4, electromagnetic clutch 3 may be disengaged, and first control signal 17 may be transmitted to second drive source 5 to control the rotational speed of second drive source 5. Nevertheless, when first drive source 2 drives compressor 4, first control signal 17 may be deactivated, second control signal 18 may be transmitted to electromagnetic clutch 3 or a controller thereof (not shown), and electromagnetic clutch 3 may be engaged. In another embodiment of the present invention, first drive source 2 and second drive source 5 may operate simultaneously. Moreover, based on temperature $T_{eva}$ of air dispensed from evaporator 9, controller 15 may select the rotational speed of second drive source 5, or determine whether to engage or disengage electromagnetic clutch 3.

Referring to FIG. 2, an operation 200 of air conditioning system 100 according to an embodiment of the present invention is depicted. In step 205, air conditioning system 100 transitions from active to inactive, i.e., is activated, and controller 15 receives third signal 16c. Moreover, in step 210, temperature sensor 14 measures temperature $T_{eva}$ of air dispensed from evaporator 9, and transmits first signal 16a to controller 15. In step 215, controller 15 compares temperature $T_{eva}$ to a predetermined temperature and transmits second control signal 18 to electromagnetic clutch 3. For example, when temperature $T_{eva}$ is greater than or equal to the predetermined temperature, first drive source 2 drives compressor 4. Similarly, when temperature $T_{eva}$ is less than the predetermined temperature, compressor 4 remains inactive or transitions from active to inactive if compressor 4 previously was active. In an embodiment, the predetermined temperature may be about 4° C., and temperature sensor 14 may have an accuracy of about ±1° C. As such, when temperature $T_{eva}$ is greater than or equal to about 4° C., first drive source 2 may drive compressor 4, and when temperature $T_{eva}$ is less than or equal to about 3° C., compressor 4 remains inactive or transitions from active to inactive if compressor 4 previously was active. In step 226, controller 15 receives fifth signal 16e, and determines whether the vehicle is in the idle-stop mode, i.e., when the vehicle's speed is less than the predetermined speed during vehicle operation. If the vehicle currently is not in the idle-stop mode, the operation of air conditioning system 100 returns to step 210. Nevertheless, if the vehicle currently is in the idle-stop mode, the operation of air conditioning system 100 proceeds to step 225.

In step 225, first drive source 2 transitions from engaged to disengaged via electromagnetic clutch 3, and second drive source 5 transitions from disengaged to engaged via first control signal 17. In step 230, temperature sensor 14 measures temperature $T_{eva}$ of air dispensed from evaporator 9, and transmits first signal 16a to controller 15. In step 235, controller 15 compares temperature $T_{eva}$ to the predetermined temperature and transmits first control signal 17 to second drive source 5. For example, when temperature $T_{eva}$ is greater than or equal to the predetermined temperature, second drive source 5 drives compressor 4. Similarly, when temperature $T_{eva}$ is less than the predetermined temperature, compressor 4 remains inactive or transitions from active to inactive if compressor 4 previously was active. Moreover, in step 240, controller 15 receives second signal 16b, and determines voltage $B_t$ of the electrical power supply for second drive source 5.

In step 245, controller 15 determines whether voltage $B_t$ is greater than a minimum electrical power supply voltage $B_{t0}$, e.g., a voltage sufficient for second drive source 5 to drive hybrid compressor 4. If voltage $B_t$ is less than minimum electrical power supply voltage $B_{t0}$, the operation of air conditioning system proceeds to step 260. In step 260, second drive source 5 transitions from engaged to disengaged via first control signal 17, and controller 15 transmits second control signal 18 to electromagnetic clutch 3, such that first drive source 2 transitions from disengaged to engaged via electromagnetic clutch 3. The operation of air conditioning system then returns to step 210.

Nevertheless, if in step 245 controller 15 determines that voltage $B_t$ is greater than or equal to minimum electrical power supply voltage $B_{t0}$, the operation of air conditioning system 100 proceeds to step 250. In step 250, controller 15 receives fourth signal 16d and determines the amount of electric power W consumed by second drive source 5. In step 255, controller 15 determines whether the amount of electric power W consumed by second drive source 5 is greater than a maximum electric power $W_L$. If the amount of electric power W consumed by second drive source 5 is greater than or equal to maximum electric power $W_L$, the operation of air conditioning system 100 returns to step 260, e.g., second drive source 5 transitions from engaged to disengaged via first control signal 17, and controller 15 transmits second control signal 18 to electromagnetic clutch 3, such that first drive source 2 transitions from disengaged to engaged via electromagnetic clutch 3.

Nevertheless, if the amount of electric power W consumed by second drive source 5 is less than maximum electric power $W_L$, the operation of air conditioning system 100 proceeds to step 265. In step 265, controller 15 receives fifth signal 16e, and determines whether the vehicle still is in the idle-stop mode. When the vehicle still is in the idle-stop mode, then the operation of air conditioning system 100 returns to step 230, i.e., temperature sensor 14 measures temperature $T_{eva}$ of air dispensed from evaporator 9, and transmits first signal 16a to controller 15. However, if the vehicle is not in the idle-stop mode, then the operation of air conditioning system 100 returns to step 260, i.e., second drive source 5 transitions from engaged to disengaged via first control signal 17, and controller 15 transmits second control signal 18 to electromagnetic clutch 3, such that first drive source 2 transitions from disengaged to engaged via electromagnetic clutch 3.

Thus, during vehicle operation, when (1) the vehicle is operating in idle-stop mode, (2) voltage $B_t$ of the electrical power supply is greater than or equal to minimum electrical power supply voltage $B_{t0}$, and (3) the amount of electric power W consumed by second drive source 5 is less than maximum electric power $W_L$, second drive source 5 drives hybrid compressor 4. However, when during vehicle operation these three conditions initially are satisfied, and subsequently one of these three conditions no longer is satisfied, second drive source 5 may transition from engaged to disengaged via first control signal 17, and controller 15 may transmit second control signal 18 to electromagnetic clutch 3, such that first drive source 2 transitions from disengaged to engaged via electromagnetic clutch 3.

While the invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are consider exemplary only, with the true scope of the invention indicated by the following claims.

What is claimed is:

1. An air conditioning system for a vehicle comprising a first drive source, wherein the air conditioning system comprises:
   at least one compressor comprising a second drive source, wherein the at least one compressor is driven by the first drive source or the second drive source, or a combination thereof, and the second drive source comprises an electrical power supply; and
   means for selecting between the first drive source and the second drive source, such that when the at least one compressor is active, at least the first drive source drives the at least one compressor except when:
      the vehicle is operating in at least one predetermined mode; and
      a voltage of the electrical power supply is greater than or equal to a minimum electrical power supply voltage.

2. The air conditioning system of claim 1, wherein the at least one predetermined mode comprise an idle-stop mode.

3. The air conditioning system of claim 1, wherein the at least one compressor further comprises:
   a first compression mechanism driven by the first drive source; and
   a second compression mechanism driven by the second drive source.

4. The air conditioning system of claim 1, wherein the first drive source comprises an engine, the second drive source comprises an electric motor, and the electric power supply comprises a battery.

5. The air conditioning system of claim 1, further comprising:
   means for determining whether the vehicle is operating in an idle-stop mode; and
   means for determining whether the voltage of the electrical power supply is greater than or equal to the minimum electrical power supply voltage.

6. The air conditioning system of claim 1, further comprising:
   an evaporator; and
   means for determining whether a temperature of air dispensed from the evaporator is greater than a predetermined temperature, wherein the at least one compressor is inactive when the temperature of air dispensed from the evaporator is less than the predetermined temperature, and the at least one compressor is active when the temperature of air dispensed from the evaporator is greater than or equal to the predetermined temperature.

7. An air conditioning system for a vehicle comprising a first drive source, wherein the air conditioning system comprises:

at least one compressor comprising a second drive source, wherein the at least one compressor is driven by the first drive source or the second drive source, or a combination thereof, and the second drive source comprises an electrical power supply; and means for selecting between the first drive source and the second drive source, such that when the at least one compressor is active, at least the first drive source drives the at least one compressor except when:

the vehicle is operating in at least one predetermined mode; and an amount of electrical power delivered by the electrical power supply to the second drive source is greater than or equal to a minimum electrical power.

8. The air conditioning system of claim 7, wherein the at least one predetermined mode comprises an idle-stop mode.

9. The air conditioning system of claim 7, wherein the at least one compressor further comprises:

a first compression mechanism driven by the first drive source; and a second compression mechanism driven by the second drive source.

10. The air conditioning system of claim 7, wherein the first drive source comprises an engine, the second drive source comprises an electric motor, and the electric power supply comprises a battery.

11. The air conditioning system of claim 7, further comprising:

means for determining whether the vehicle is operating in an idle-stop mode; and means for determining whether the amount of electrical power delivered by the electrical power supply to the second drive source is greater than or equal to the minimum electrical power.

12. The air conditioning system of claim 7, further comprising:

an evaporator; and means for determining whether a temperature of air dispensed from the evaporator is greater than a predetermined temperature, wherein the at least one compressor is inactive when the temperature of air dispensed from the evaporator is less than the predetermined temperature, and the at least one compressor is active when the temperature of air dispensed from the evaporator is greater than or equal to the predetermined temperature.

13. A vehicle comprising:

a first drive source; and an air conditioning system comprising:

at least one compressor comprising a second drive source, wherein the at least one compressor is driven by the first drive source or the second drive source, or a combination thereof, and the second drive source comprises an electrical power supply; and means for selecting between the first drive source and the second drive source, such that when the at least one compressor is active, at least the first drive source drives the at least one compressor except when:

the vehicle is operating in an idle-stop mode; and a voltage of the electrical power supply is greater than or equal to a minimum electrical power supply voltage.

14. The vehicle of claim 13, wherein the at least one compressor further comprises:

a first compression mechanism driven by the first drive source; and a second compression mechanism driven by the second drive source.

15. The vehicle of claim 13, wherein the first drive source comprises an engine, the second drive source comprises an electric motor, and the electric power supply comprises a battery.

16. The vehicle of claim 13, further comprising:

means for determining whether the vehicle is operating in an idle-stop mode; and means for determining whether the voltage of the electrical power supply is greater than or equal to the minimum electrical power supply voltage.

17. The air conditioning system of claim 13, further comprising:

an evaporator; and means for determining whether a temperature of air dispensed from the evaporator is greater than a predetermined temperature, wherein the at least one compressor is inactive when the temperature of air dispensed from the evaporator is less than the predetermined temperature, and the at least one compressor is active when the temperature of air dispensed from the evaporator is greater than or equal to the predetermined temperature.

18. A vehicle comprising:

a first drive source; and an air conditioning system comprising:

at least one compressor comprising a second drive source, wherein the at least one compressor is driven by the first drive source or the second drive source, or a combination thereof, and the second drive source comprises an electrical power supply; and means for selecting between the first drive source and the second drive source, such that when the at least one compressor is active, at least the first drive source drives the at least one compressor except when:

the vehicle is operating in at least one predetermined mode; and an amount of electrical power delivered by the electrical power supply to the second drive source is greater than or equal to a minimum electrical power.

19. The vehicle of claim 18, wherein the at least one predetermined mode comprises an idle-stop mode.

20. The vehicle of claim 18, wherein the at least one compressor further comprises:

a first compression mechanism driven by the first drive source; and a second compression mechanism driven by the second drive source.

21. The vehicle of claim 18, wherein the first drive source comprises an engine, the second drive source comprises an electric motor, and the electric power supply comprises a battery.

22. The vehicle of claim 18, further comprising:

means for determining whether the vehicle is operating in an idle-stop mode; and means for determining whether the amount of electrical power delivered by the electrical power supply to the second drive source is greater than or equal to the minimum electrical power.

23. The vehicle of claim 18, further comprising:

an evaporator; and means for determining whether a temperature of air dispensed from the evaporator is greater than a predetermined temperature, wherein the at least one compressor is inactive when the temperature of air dispensed from the evaporator is less than the predetermined temperature, and the at least one compressor is active when the temperature of air dispensed from the evaporator is greater than or equal to the predetermined temperature.

24. A method for driving at least one compressor of an air conditioning system of a vehicle, wherein the vehicle comprises a first drive source, and the air conditioning system comprises the at least one compressor, wherein the at least one compressor comprises a second drive source, and the second drive source comprises an electrical power supply, wherein the at least one compressor is driven by the first drive source or the second drive source, or a combination thereof, and the method comprises the steps of:

determining whether the vehicle is operating in at least one predetermined mode;

activating the second drive source when the vehicle is operating in the at least one predetermined mode; and determining whether an amount of electric power consumed by the second drive source is greater than or equal to a maximum electric power switching the drive of the at least one compressor from the second drive source to the first drive source.

25. The method of claim 24, wherein the at least one predetermined mode comprises an idle-stop mode.

26. The method of claim 24, further comprising the steps of:

deactivating the second drive source when a voltage of the electrical power supply is less than a minimum electrical power supply voltage; and activating the first drive source when the voltage of the electrical power supply is less than the minimum electrical power supply voltage.

27. The method of claim 24, further comprising the steps of:

deactivating the second drive source when an amount of electrical power delivered by the electrical power supply to the second drive source is less than a minimum electrical power; and activating the first drive source when the amount of electrical power delivered by the electrical power supply to the second drive source is less than the minimum electrical power.

28. The method of claim 24, wherein the at least one compressor further comprises:

a first compression mechanism driven by the first drive source; and a second compression mechanism driven by the second drive source.

29. The method of claim 24, wherein the first drive source comprises an engine, the second drive source comprises an electric motor, and the electric power supply comprises a battery.

* * * * *